United States Patent [19]
Lee

[11] Patent Number: 5,812,177
[45] Date of Patent: Sep. 22, 1998

[54] TEST PATTERN GENERATING APPARATUS OF A LASER PRINTER

[75] Inventor: Su-Bong Lee, Kyoungki-do, Rep. of Korea

[73] Assignee: Hyundai Electronics Industries Co., Ltd., Rep. of Korea

[21] Appl. No.: 365,674

[22] Filed: Dec. 29, 1994

[30] Foreign Application Priority Data

Dec. 29, 1993 [KR] Rep. of Korea .................. 1993-30574

[51] Int. Cl.$^6$ .................................. B41J 2/47; H01S 3/00
[52] U.S. Cl. .............................................................. 347/247
[58] Field of Search ..................................... 347/237, 252, 347/247, 131, 234, 242

[56] References Cited

U.S. PATENT DOCUMENTS 5,291,221  3/1994  Sanger et al. ............................ 347/234

*Primary Examiner*—Benjamin R. Fuller
*Assistant Examiner*—L. Anderson
*Attorney, Agent, or Firm*—Merchant, Gould, Smith, Edell, Welter & Schmidt, P.A.

[57] ABSTRACT

A test pattern generating apparatus of a laser printer capable of simply performing a test of an engine section of a printer apparatus such as a laser printer and a facsimile machine and of judging whether or not a control circuit of the engine section or data control circuit thereof is normally operated when in use is disclosed. The present invention includes a beam detection receiving circuit for receiving beam detection signals from a laser scanning apparatus; a first counter circuit for counting main clock signals of a central processing unit by N number in response to beam detection signals obtained from the beam detection receiving circuit and for controlling the beam detection receiving circuit; a buffer for buffering the beam detection signals obtained from the beam detection receiving; a n/N counter control circuit for generating count enabling signals in response to the beam detection signals obtained from the beam detection receiving circuit; a second counter circuit for counting beam detection signals, obtained from the buffer by the count enabling signals of the n/N counter control circuit and the count control signals of the central processing unit, by 1 first and second set values; a N/n difference pulse generating circuit for generating a pulse data of a vertical line having a width of a difference of the first and second set clocks obtained from the second counter circuit; and a M counter circuit for controlling the n/N counter control circuit by counting the pulse generated from the N-n difference pulse generating circuit by a set value.

14 Claims, 2 Drawing Sheets

TEST PATTERN GENERATING APPARATUS OF A LASER PRINTER

BACKGROUND OF THE INVENTION

1. Field of the Invention

The present invention relates to a test pattern generating apparatus of a laser printer, and in particular to a test pattern generating apparatus of a laser printer capable of simply performing a test of an engine section of a printer apparatus such as a laser printer and a facsimile machine and of judging whether or not a control circuit of the engine section or a data control circuit thereof is normally operated when in use.

2. Description of the Conventional Art

Conventionally, a system consisting of a data control circuit for processing data of an engine section for printing such as a laser printer and of a data control circuit for processing data of a personal computer(P.C.) has not data processing function itself, so that an additional apparatus such as a test board or a data control circuit should be provided therein, however those kinds of additional apparatuses can not be provided due to high prices, and even though the apparatuses are provided therein, it needs too much time for testing itself and for disassembling the apparatus.

SUMMARY OF THE INVENTION

Accordingly, it is an object of the present invention to provide a test pattern generating apparatus of a laser printer capable of simply performing a test of an engine section of a printer apparatus such as a laser printer and a facsimile machine and of judging whether or not a control circuit of the engine section or data control circuit thereof is normally operated when in use.

To achieve the objects of the present invention, it includes a beam detection receiving circuit for receiving beam detection signals from a laser scanning apparatus; a first counter circuit for counting main clock signals of a central processing unit by N number in response to beam detection signals obtained from the beam detection receiving circuit and for controlling the beam detection receiving circuit; a buffer for buffering the beam detection signals obtained from the beam detection receiving;
a n/N counter control circuit for generating count enabling signals in response to the beam detection signals obtained from the beam detection receiving circuit; a second counter circuit for counting beam detection signals, obtained from the buffer by the count enabling signals of the n/N counter control circuit and the count control signals of the central processing unit, by 1 first and second set values; a N/n difference pulse generating circuit for generating a pulse data of a vertical line having a width of a difference of the first and second set clocks obtained from the second counter circuit; and a M counter circuit for controlling the n/N counter control circuit by counting the pulse generated from the N-n difference pulse generating circuit by a set value.

DESCRIPTION OF THE PREFERRED EMBODIMENTS

Figure 1:
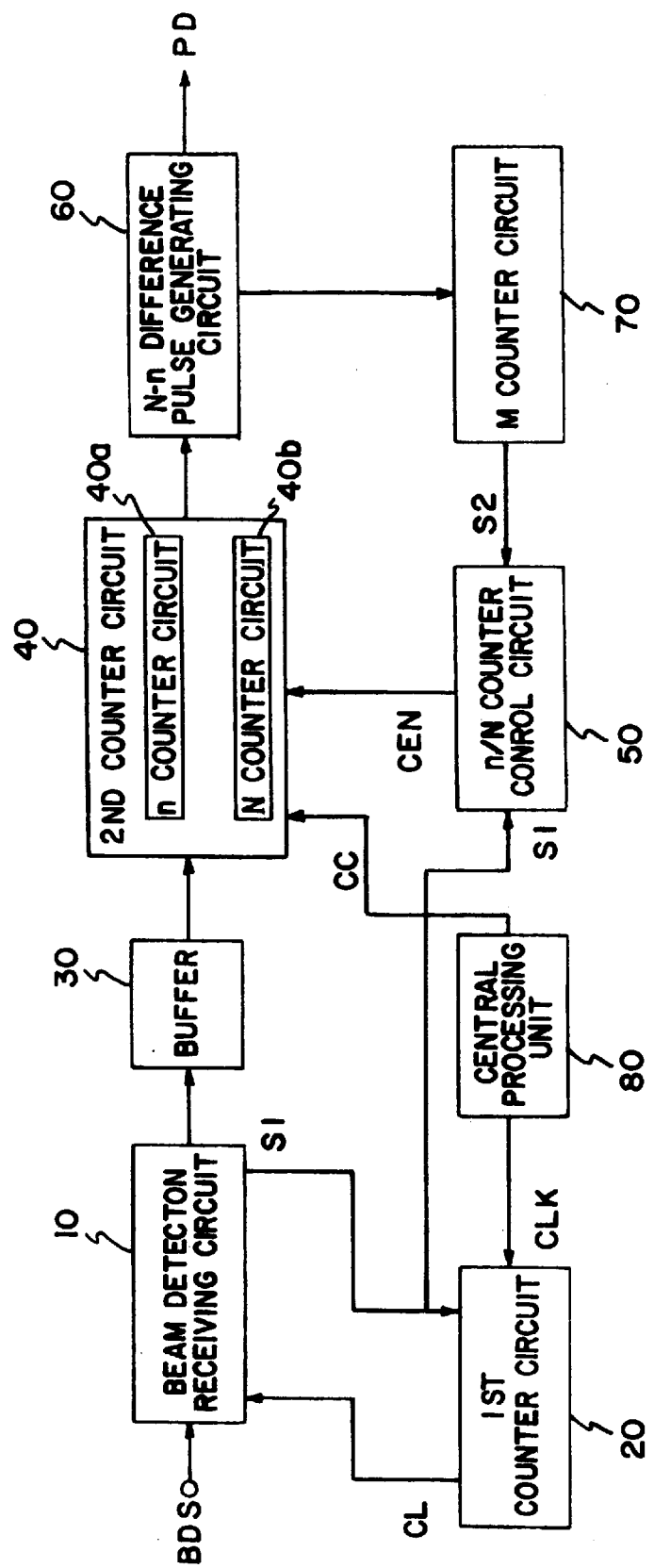
FIG. 1 is a view showing a structure of a test pattern generating apparatus of a laser printer according to the present invention.

Referring to FIG. 1, the present invention includes a beam detection receiving circuit 10 for receiving a Beam Detection Signal(BDS) obtained from the laser scanning apparatus of a laser printer; a first counter circuit 20 for generating main clock signals inputted to the beam detection receiving circuit 10 by counting 121 set value inputted from the beam detection receiving circuit 10 thereto in a form of a clear signal CL; a buffer circuit 30 for buffering the beam detection signals BDS received from the beam detection receiving circuit 10; a n/N counter control circuit 50 for generating count enabling signals CEN for setting a left margin from a generating point of beam detection signals received from the beam detection receiving circuit 10 to a line where the data is printed out; a second counter circuit 40 for counting the beam detection signals inputted from the buffer 30 by the counter control signals CC, inputted from the count enabling signals SEN and a central processing unit of the n/N counter control circuit 50, by n number(n=109) through the n counter 40a and for outputting N number set value through the N counter 40b; a N–n difference pulse generating circuit 60 for generating a pulse data PD of a vertical line having a width of a difference of n-clock and N-clock obtained from the second counter circuit 40; a M counter circuit for terminating the pulse data PD of a vertical line by disabling the n/N counter control circuit 50 when the count is completed by counting M number set value of pulse generated from the N–n difference pulse generating circuit 60.

The operation of the present invention will now be explained.

To begin with, the beam detection signals BDS are outputted from the laser scanning apparatus of the laser printer and inputted to the beam detection receiving circuit 10.

The beam detection receiving circuit 10 receives the beam detection signals BDS when it is inputted from the laser scanning apparatus and send the trigger signals S1 to the first counter circuit 20 and the n/N counter control circuit 50 and send the beam detection signals BDS to the buffer circuit 30.

The first counter circuit 20 counts the clock signals by N number(N=121) provided from the central processing unit when the trigger signals S1 is inputted from the beam detection receiving circuit 10. Thereafter, the first counter circuit 20 completes to count the N clocks and causes the beam detection receiving circuit 10 as shown in FIG. 2C to generate the clear signals CL and the beam detection signals BDS to be inputted.

The buffer circuit 30 buffers when the beam detection signals are inputted from the beam detection receiving circuit 10 and sends the buffered signals to the n counter 40a and the N counter 40b of the second counter 40.

At this time, the n/N counter control circuit 50 disable the n counter 40a and the N counter 40b until the n counter 40a and the N counter 40b count the 918 number, a first X number, of clocks at the second counter circuit 40 for securing the left and right margins when the trigger signals S1 are takes place from the beam detection receiving circuit 10. When the first X number clocks is completed to be counted, the n/N counter control circuit 50 controls the n counter 40a and N counter 40b of the second counter circuit 40.

Figures 2A, 2B, 2C, 2D:
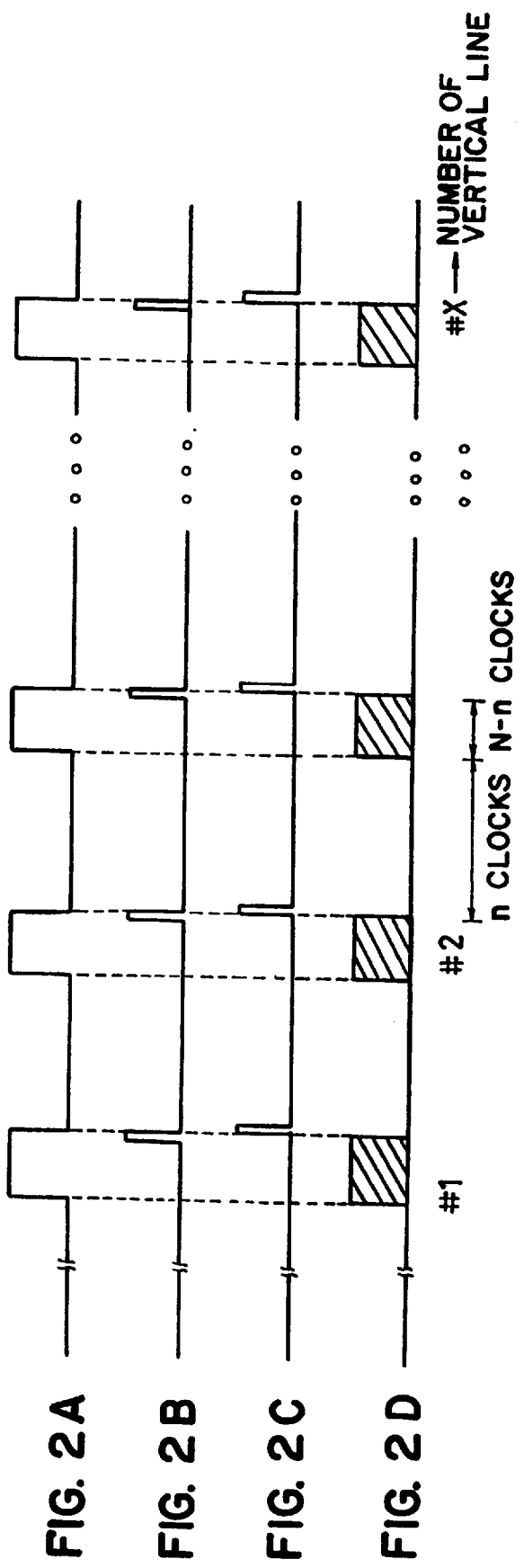
FIG. 2A is a view showing a data output time of N-clock counter circuit.
FIG. 2B is a view showing a data output time of n-clock counter circuit.
FIG. 2C is a view showing a clear signal time of n/N counter circuit.
FIG. 2D is a view showing a vertical line data output time of N–n pulse generating circuit.

When the count enabling signals CEN is inputted from the n/N counter control circuit 50, the second counter circuit 40 counts the beam detection signals inputted from the buffer circuit 30 at the n counter 40a by the set n number value (n=109) as shown in FIG. 2A, and thereafter, inputs the counted n clocks into the N−n difference pulse generating circuit 60.

In addition, the V counter 40b of the second counter circuit 40 counts the beam detection signals inputted from the buffer circuit 30 by the count enabling signals CEN inputted from the n/N counter control circuit 50 by the set N number(N=121) and inputs the N number clocks as shown in FIG. 2B into the N−n difference pulse generating circuit 60, so that the pulse data PD of the vertical line having a width of a difference of the inputted n clocks and N clocks in a form of FIG. 2D.

When the number of the pulse data PD is reached to M number(M−106) the M counter circuit 70 sends the counter using impossible signals S2 to the n/N counter control circuit 50. At this time, the n/N counter control circuit 50 terminates the processing of the n counter 40a and the N counter 40b of the second counter circuit 40 and the generation of the pulse data PD of the vertical line.

Meanwhile, the second counter circuit 40 judges whether or not the printer is processing the data when a test pattern button is pushed by the counter control signals CC and when the test pattern is possible, the second counter circuit 40 receives the count enabling signals CEN through the n/N counter control circuit 50 and terminates the test pattern generating function when in process of the data.

Referring to FIGS. 2A and 2B, the n counter 40a counts X clocks for securing the left and right margins from the n/N counter control circuit 50 and counts the n clocks.

The n counter 40a scans and prints the laser beam by a difference of the n clock and the N clock as shown in FIG. 2D, and stop to print in response to the clear signals CL and begins to count the n clock and the N clock as shown in FIG. 2C and prints the M number by a difference of each clock. When the M number is printed out the n counter 40a sends the using impossible signals S2 to the n/N counter control circuit 50 and terminates the output of the pulse data PD of the vertical line.

As described above the present invention can perform a diagnosis of a printer apparatus such as a laser printer and a facsimile machine by adapting a vertical line output function at the engine section thereof and detects that the engine section or data control circuit thereof is normally operated when in use.

What is claimed is:

1. A test pattern generating apparatus of a laser printer having a laser scanning apparatus for generating beam detection signals, comprising:

beam detection receiving means for receiving beam detection signals from said laser scanning apparatus;

a central processing unit for generating main clock signals and count control signals;

first counter means for counting said main clock signals of the central processing unit to a set number "N", wherein N is an integer, in response to said beam detection signals obtained from the beam detection receiving means and for controlling the beam detection receiving means;

buffer means for buffering the beam detection signals obtained from the beam detection receiving means;

n/N counter control means for generating count enabling signals in response to the beam detection signals obtained from the beam detection receiving means;

second counter means for counting beam detection signals, obtained from the buffer means in response to the count enabling signals of the n/N counter control means and the count control signals of the central processing unit, to a set number "n" and then to the set number "N", wherein n denotes an integer;

N−n difference pulse generating means for generating a pulse data of a vertical line having a width of a difference of the set number "n" and the set number "N" obtained from the second counter means; and M counter means for controlling the n/N counter control means by counting a pulse generated from the N−n difference pulse generating means to a set number "M", wherein M denotes an integer.

2. The apparatus of claim 1, wherein said beam detection receiving means receives beam detection signals, sends trigger signals to the first counter means and the n/N counter control means, receives clear signals from the first counter means and becomes ready to receive the additional beam detection signals.

3. The apparatus of claim 1, wherein said first counter means counts the main clock signals of the central processing unit to the set number "N" upon receiving the trigger signals from the beam detection receiving means and clears the beam detection receiving means in order that a next beam detection signal may be inputted.

4. The apparatus of claim 3, wherein said set number N of the first counter means is 121.

5. The apparatus of claim 1, wherein said second counter means counts the beam detection signals of the buffer means to the set number "n" and then, to the set number "N" when the count enabling signals are received from the n/N counter control means and inputs the set number "n" and the set number "N" into the N−n difference pulse generating means.

6. The apparatus of claim 5, wherein said second counter means includes a n counter means for counting beam detection signals obtained from the buffer means to the set number "n" and N counter means for counting beam detection signals to the set number first "N" before the counting of the first set number "n" at the n counter means.

7. The apparatus of claim 5, wherein said set number n of the counter means is 109 and the second set count number N thereof is 121.

8. The apparatus of claim 1, wherein said second counter means judges whether or not there is print instruction data in response to count control signals of the central processing unit and receives count enabling signals from the n/N counter control means when the print instruction data is not processed and terminates a test pattern generating function when the print instruction data is processed.

9. The apparatus of claim 8, wherein said second counter means includes n counter means for counting beam detection signals obtained from the buffer means to the set number "n" and N counter means for counting beam detection signals to the set number "N" before the counting of the set number "n" at the n counter means.

10. The apparatus of claim 1, wherein said n/N counter control means controls the second counter means not to operate until X clock signals wherein X is an integer, are counted at the second counter means in order to secure a left margin from a generating point of the beam detection signals from the beam detection receiving means for a line on which data is printed out and controls the second counter means to operate when X number clock signals count is completed.

11. The apparatus of claim 10, the n/N counter control means controls the second counter means not to operate until the second counter means counts 918 number X of clock signals.

12. The apparatus of claim 1, wherein said M counter means generates disable signals to the n/N counter means when pulses generated from the N–n difference pulse generating means reaches the set number "M", thereby terminating generation of the pulse data for the vertical line.

13. The apparatus of claim 12, wherein said N–n difference pulse generation means receives the set number "n" obtained from the second counter means through a clock terminal and receives the set number "N" through a clear terminal.

14. The apparatus of claim 12, wherein said set number m of the M counter means is 106.

* * * * *